United States Patent
Xu et al.

(10) Patent No.: US 7,362,920 B2
(45) Date of Patent: Apr. 22, 2008

(54) METHOD AND SYSTEM FOR HYBRID RIGID REGISTRATION BASED ON JOINT CORRESPONDENCES BETWEEN SCALE-INVARIANT SALIENT REGION FEATURES

(75) Inventors: Chenyang Xu, Allentown, NJ (US); Xiaolei Huang, Princeton, NJ (US); Yiyong Sun, Lawrenceville, NJ (US); Frank Sauer, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 660 days.

(21) Appl. No.: 10/945,675

(22) Filed: Sep. 21, 2004

(65) Prior Publication Data

US 2005/0078881 A1 Apr. 14, 2005

Related U.S. Application Data

(60) Provisional application No. 60/504,883, filed on Sep. 22, 2003.

(51) Int. Cl.
G06K 9/32 (2006.01)

(52) U.S. Cl. .................. 382/294; 382/276

(58) Field of Classification Search .......... 382/209, 382/217, 285, 287, 294, 305, 312, 276; 378/65, 378/205
See application file for complete search history.

(56) References Cited

U.S. PATENT DOCUMENTS

| | | | |
|---|---|---|---|
| 5,926,568 A * | 7/1999 | Chaney et al. ............ 382/217 |
| 6,101,238 A * | 8/2000 | Murthy et al. ............. 378/62 |
| 6,125,164 A * | 9/2000 | Murphy et al. ............ 378/65 |
| 6,282,318 B1 * | 8/2001 | Dietrich et al. ........... 382/209 |
| 6,597,818 B2 * | 7/2003 | Kumar et al. ............. 382/294 |
| 7,204,640 B2 * | 4/2007 | Fu et al. .................. 378/205 |

OTHER PUBLICATIONS

Liang Z-P et al: Automated registration of multimodality images by maximization of a region similarity measure Image Processing, 1997. Proceedings., International Conference on Santa Barbara, CA, USA Oct. 26-29, 1997, Los Alamitos, CA, USA, IEEE Comput. Soc, US, vol. 3, Oct. 26, 1997, pp. 272-275, XP010253791 ISBN: 0-8186-8183-7, p. 274, right-hand column, line 26-line 33.

(Continued)

*Primary Examiner*—Kanjibhai Patel
(74) *Attorney, Agent, or Firm*—Donald B. Paschburg; F. Chau & Associates, LLC

(57) ABSTRACT

A method of aligning a pair of images includes providing a pair of images with a first image and a second image, wherein the images comprise a plurality of intensities corresponding to a domain of points in a D-dimensional space. Salient feature regions are identified in both the first image and the second image, a correspondence between each pair of salient feature regions is hypothesized, wherein a first region of each pair is on the first image and a second region of each pair is on the second image, the likelihood of the hypothesized correspondence of each pair of feature regions is measured, and a joint correspondence is determined from a set of pairs of feature regions with the greatest likelihood of correspondence.

38 Claims, 11 Drawing Sheets

OTHER PUBLICATIONS

Viola P et al: "Alignment by Maximization 10 of Mutual Information" Proceedings of the Fifth International Conference on Computer Vision. Cambridge, MA., Jun. 20-23, 1995, Proceedings of the International Conference on Computer Vision, Los Alamitos, IEEE Comp. Soc. Press, US, vol. CONF. 5, Jun. 20, 1995, pp. 16-23, XP000557046 ISBN: 0-7803-2925-2 p. 17, left-hand column, paragraph 2.1.

WO 02/27660 A (Marconi Medical Systems, Inc; Koninkluke Philips Electronics N.V) Apr. 4, 2002 p. 8, line 16-line 20.
Maes F et al: "Multimodality Image Registration by Maximization of Mutual Information" IEEE Transactions on Medical Imaging, IEEE Service Center, Piscataway, NJ, US, vol. 16, No. 2, Apr. 1991, pp. 187-198, XP000685807 ISSN: 0278-0062 p. 188, left-hand column, paragraph II—p. 191, left-hand column, paragraph IV.

* cited by examiner

METHOD AND SYSTEM FOR HYBRID RIGID REGISTRATION BASED ON JOINT CORRESPONDENCES BETWEEN SCALE-INVARIANT SALIENT REGION FEATURES

CROSS REFERENCE TO RELATED UNITED STATES APPLICATIONS

This application claims priority from "Fast Rigid Image Registration based on Joint Correspondences between Salient Region Features", Provisional Patent Application No. 60/504,883 of Xu, et al., filed Sep. 22, 2003, the contents of which are incorporated herein by reference.

BACKGROUND OF THE INVENTION

Image registration aims to spatially align one image to another. For that purpose, parameters of a global transformation model, such as a rigid, affine or projective transformation, are to be recovered to geometrically transform a moving image to achieve high spatial correspondence with a fixed image. The problem has been studied in various contexts due to its significance in a wide range of areas, including medical image fusion, remote sensing, recognition, tracking, mosaicing, and so on.

Rigid registration of 2D/3D medical images is a vital component of a large number of registration and fusion applications. In the areas of diagnosis, planning, evaluation of surgical and radio-therapeutical procedures, typically multiple single-modality, or multi-modality images are acquired in the clinical track of events. Since these images are complementary to each other, the integration of useful data from separate images are often desired. Rigid registration, a first step in this integration process, aims to bring the multiple images involved into spatial alignment.

Existing methods for image registration can be classified into three categories: feature-based methods, intensity-based methods, and hybrid methods that integrate the previous two. Feature-based methods use sparse geometric features such as points, curves, and/or surface patches, and their correspondences to compute an optimal transformation. These methods are relatively fast. However, these methods lack robustness of feature extraction and accuracy of feature correspondences, and have frequent need of user interaction. Intensity-based registration methods operate directly on the intensity values from the full content of the image, without prior feature extraction. These methods have attracted attention because they can be made fully automatic and can be used for multimodality image matching by utilizing appropriate similarity measures. However, these methods tend to have high computational cost due to the need for optimization of complex, non-convex energy functions. In addition, they require the poses of two input images be close enough to converge to a local optimum. Furthermore, they often perform poorly when partial matching is required.

Recently, several hybrid methods have been proposed that integrate the merits of both feature-based and intensity-based methods. Most focus on incorporating user provided or automatically extracted geometric feature constraints into the intensity-based energy functionals to achieve smoother and faster optimization. Typically they are more flexible, and designed in such way that either intensity information, such as gray values or gradients, is incorporated into a feature-based algorithm, or feature information, such as points or surfaces, is introduced to a pixel/voxel intensity-based algorithm. The hybrid methods are expected to be more efficient and robust than the pure-feature or pure-intensity based methods.

However, dealing with structures that appear or disappear between two images is still challenging. For instance, tumor growth/shrinkage in medical images acquired in the clinical tracking of treatment, trees/shadows or construction in aerial images taken at different times, and occlusion in other natural images often lead to significant differences in local image appearance. In addition, it is still difficult in general to match images acquired by sensors of different modalities, since different sensors, such as MRI, CT or PET, may produce very dissimilar images of the same scene. The relationship between the intensities of the matching pixels is often complex and not known a priori. Image noise and intensity inhomogeneity also add to this complexity. Furthermore, given two input images under arbitrary poses, recovering the globally optimal transformation efficiently is a hard problem due to the large parameter search space. To tackle these problems, the integration of both feature-based and intensity-based methods is very attractive since they are of complementary nature. While intensity-based methods are superior in multi-modal image matching and have better robustness to image noise and inhomogeneity, the feature-based methods are more natural to handle the structure appearing/disappearing problem, occlusion, and partial matching as well as to align images despite of their initial poses.

SUMMARY OF THE INVENTION

Disclosed herein is a hybrid image registration method based on matching a small number of scale-invariant salient region features. The image alignment is driven directly by image intensities within automatically extracted salient regions. Salient region features are selected on both the fixed and moving images as those areas, each associated with a best scale, with the highest local saliency in both spatial and scale spaces. Then, in a feature matching step, the likelihood of each hypothesized fixed-moving pairing of two region features is determined from a normalized mutual information between the two regions. The result of this step is a total ordering of the likelihoods of all hypotheses about individual feature matches. Due to image noise or intensity changes, the top matches from this result often contain an unpredictable portion of outliers (i.e., mismatches), whose effects can only be partially alleviated by the use of robust estimation techniques. Utilizing the top individual feature correspondence candidates from the feature matching step, a configuration matching step is used to detect a joint correspondence between multiple pairs of salient region features that maximizes the alignedness of the fixed and moving images. The strict geometric constraints imposed by the joint correspondence make the algorithm very effective in pruning false feature matches. The combinatorial complexity associated with detecting joint correspondences is addressed in an efficient manner by using one feature pair correspondence as a minimal base, then incrementally adding to the base new feature pairs. The likelihood of each hypothesized joint correspondence is measured based on the global alignedness between the fixed image and the transformed moving image, given the transformation computed from the hypothesis. This allows convergence to the globally optimal transformation parameters. Various experiments on registering medical images of single and multiple modalities demonstrate the effectiveness of the proposed method both quantitatively and qualitatively.

In one aspect of the invention, a method of transforming a first image of a pair images with a second image of the pair, wherein the images comprise a plurality of intensities corresponding to a domain of points in a D-dimensional space, is provided. The method includes identifying salient feature regions in both the first image and the second image, hypothesizing a correspondence between each pair of salient feature regions, wherein a first region of each pair is on the first image and a second region of each pair is on the second image, measuring the likelihood of the hypothesized correspondence of each pair of feature regions, and determining a joint correspondence from a set of pairs of feature regions with the greatest likelihood of correspondence.

In a further aspect of the invention, identifying salient feature regions includes computing, for each pixel x in one image in the pair of images, a local entropy for one or more regions of scale s about pixel x, selecting a region that maximizes the local entropy for each pixel x as a best region about x, determining a saliency measure for the best region about each pixel x, identifying those pixels with local maxima of the saliency measure, and selecting feature regions with a greatest local maxima of the saliency measure as salient feature regions of interest.

In a further aspect of the invention, the steps of computing, selecting a region, determining, identifying, and selecting feature regions are repeated for the other image of the pair of images.

In another aspect of the invention, measuring the likelihood of the hypothesized correspondence of each pair of feature regions includes, for each pair of regions, calculating a similarity measure for the two regions as a function of angle $\Theta$ for each angle $\Theta$ in a set of angles sampled over the range $[-\pi, \pi)$ and selecting the maximum value of the similarity measure over the set of angles as the likelihood of correspondence of the two regions, wherein the angle $\Theta$ corresponding to the maximum value is an angle of rotation between the two regions, and selecting those pairs of regions with a maximum likelihood of correspondence as the set of regions of greatest likelihood of correspondence.

In a further aspect of the invention, each region has an associated scale and center, and for each pair of regions, prior to calculating the similarity measure, the scales of the two regions are normalized and their centers are aligned.

In a further aspect of the invention, the scale is normalized by supersampling the smaller region.

In a further aspect of the invention, determining a joint correspondence from pairs of feature regions includes calculating a global image alignedness for each pair of regions from the set of greatest likelihood of correspondence, initializing the joint correspondence C to a correspondence likelihood value $C_{ij}$ from the set of greatest likelihood of correspondence with a maximum global image alignedness, removing the $C_{ij}$ from the set of greatest likelihood of correspondences, and calculating a current image transformation from the joint correspondence. The global image alignedness is calculated for each remaining pair of regions in the set of greatest likelihood of correspondence, a new correspondence likelihood value $C_{ij}$ with a maximum global image alignedness is selected, and the global image alignedness for a combination of the joint correspondence C and the new correspondence likelihood value $C_{ij}$ is calculated. If the global image alignedness is improved by the combination of the joint correspondence C and the new correspondence likelihood value $C_{ij}$, the joint correspondence is updated and the steps of removing, calculating a current image transformation, calculating a global image alignedness, selecting, and calculating the improved global image alignedness are repeated.

In a further aspect of the invention, if the global image alignedness is not improved by the combination of the joint correspondence C and the new correspondence likelihood value $C_{ij}$, the current image transformation that aligns the two images is output.

DETAILED DESCRIPTION OF THE PREFERRED EMBODIMENTS

Figure 1:
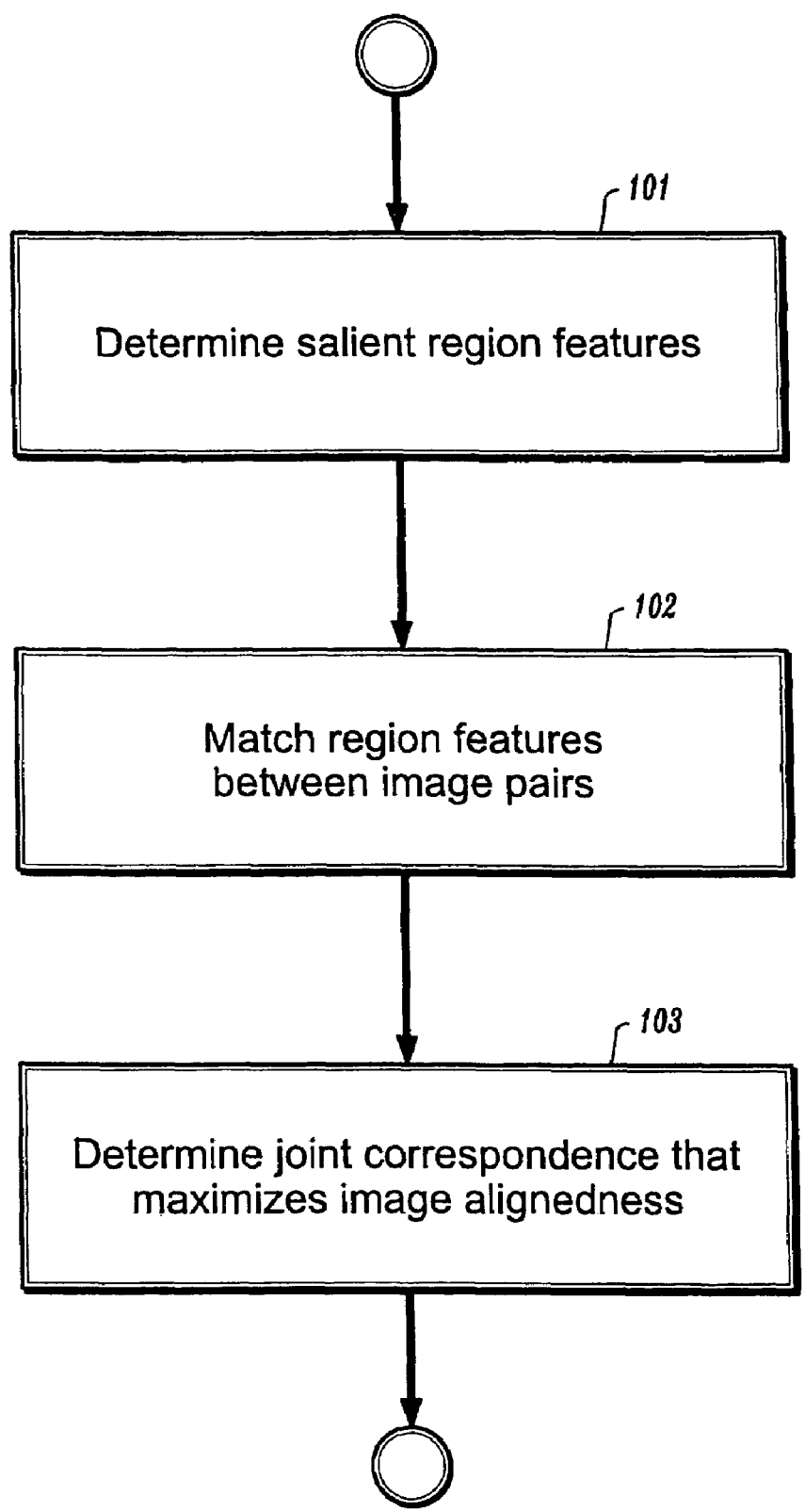
FIG. 1 depicts a flow chart of a preferred registration method of the invention.

The hybrid registration methods herein disclosed provide a generic, flexible framework in which an efficient algorithm can be developed for registration in various applications. FIG. 1 depicts a flow chart illustrating the steps of a preferred fast hybrid registration algorithm.

As a first step, step 101, salient feature regions on both the fixed image and the moving image are identified using the same criterion. In a preferred embodiment of the invention, feature selection criterion are designed to prefer features that are present in both images, and features that are relatively unique or rare. The uniqueness or rarity of a feature point is in the context of correspondence, i.e., given a feature from one image, whether the likelihood of having multiple corresponding features on the matching image is low, not in the context of the uniqueness or rarity the feature point within the same image. The uniqueness of a feature is closely related to its associated scale. At a smaller scale, edge points, corner points, or points with high curvature appear to be more unique than others. At a medium or larger scale, points in homogeneous regions or with low curvature begin to appear unique as well. Medial axis points of a shape or a homogeneous region are examples of the type of feature points that are unique at the scale with which they are associated. Every feature point of an image, regardless of its local characteristics (edgeness, cornerness, medialness, curvature, etc.), can be made unique if a proper scale and neighborhood is selected to calculate the feature point.

Figure 5:
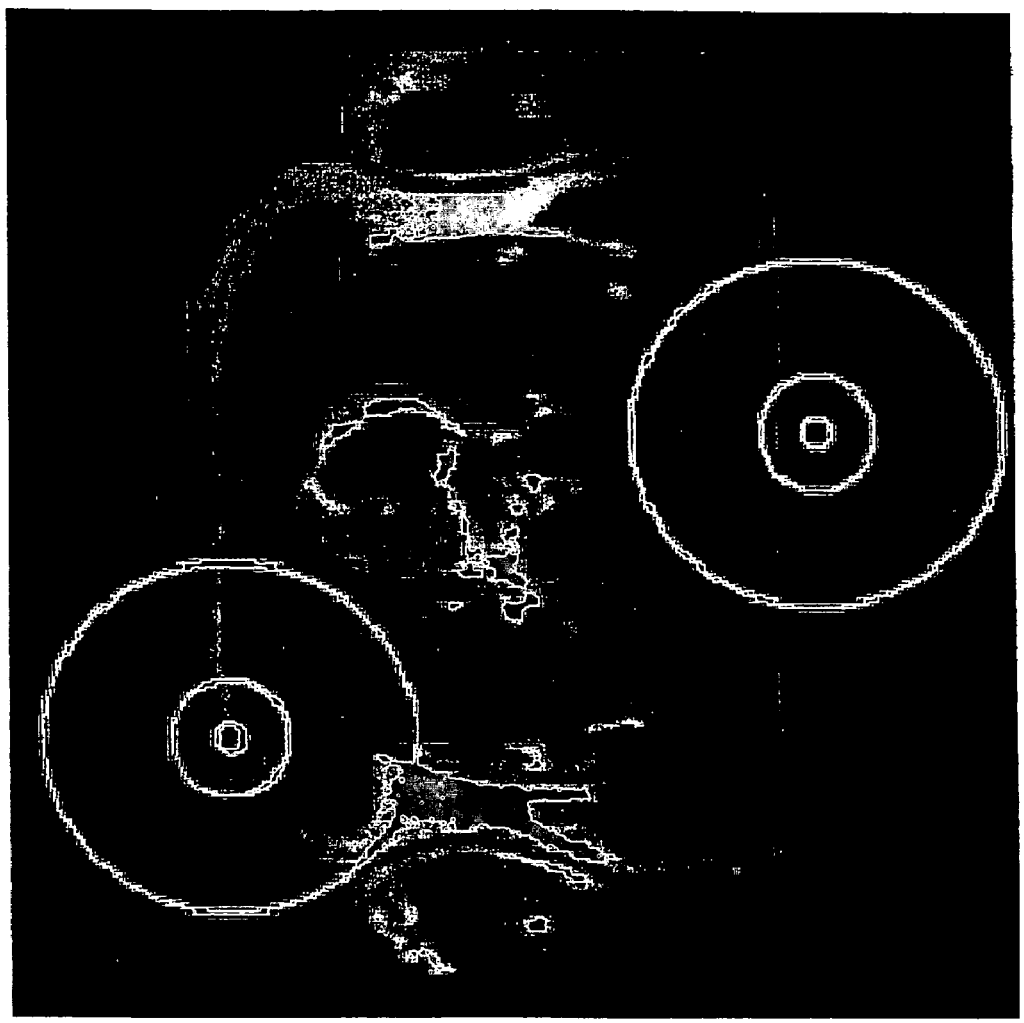
FIG. 5 depicts how a feature point can be made unique if a proper scale and neighborhood are selected.

One pictorial example of this point of view is illustrated in FIG. 5. Locally, at a small scale, a point neighborhood, indicated by the innermost circle, appears homogeneous. At a larger scale, indicated by the middle circle, the point neighborhood begins to appear unique. At a scale that is large enough, indicated by the outer circle, every point appears unique based on the characteristics of its neighborhood.

Figure 2:
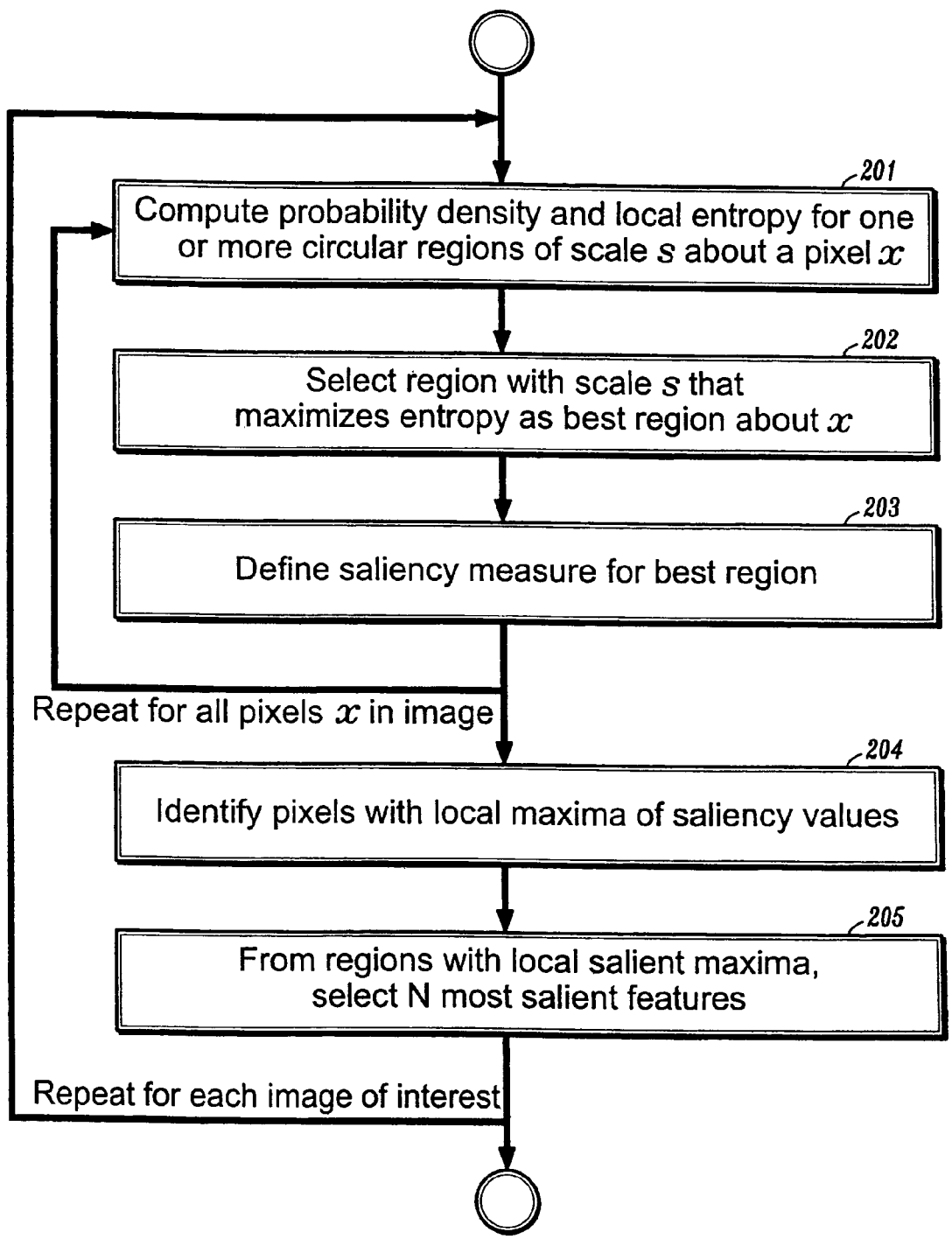
FIG. 2 depicts a flow chart of a preferred salient feature region selection method of the invention.

Referring now to FIG. 2, a preferred scale-invariant salient feature region selection method begins, at step 201, by computing, for each pixel x on an image I, a probability density function p(s,x) from the image intensities in one or more circular regions R of a radius s centered at x. The radius s defines a scale of the region. A local differential entropy of the region can be defined as $$H(s,x) = -\int_R p_i(s,x) \log_2 p_i(s,x) di,$$

where i takes on values in the set of possible intensity values. Note that the domain of the integral is limited to the circular region R. The scale that maximizes the local entropy for the region centered at x is selected, at step 202, as the best scale, $S_x$. A saliency measure $A(S_x,x)$ can be defined, at step 203, for the region with the best scale by $$A(S_x, x) = H(S_x, x) \cdot S_x \cdot \int_R \left\| \frac{\partial}{\partial s} p_i(s, x) \Big|_{S_x} \right\| di$$

using the maximal entropy value.

With the above definition of saliency, one can pick a small number N of salient region features of an image by first determining, for each pixel x in the image, the best scale $S_x$ for a region centered about the pixel, and the saliency value $A(S_x,x)$ for the region. Then, at step 204, pixels having local maxima of saliency values are identified. From among these regions with local salient maxima, one can select, at step 205, the N most salient features as feature regions for the image.

These steps can be repeated for each image of interest to define feature regions for each image. Denoting the fixed image by $I_f$ and a moving image by $I_m$, with $N_f$ and $N_m$ salient feature regions, respectively, a correspondence $C_{i,j}$ can be hypothesized between the ith feature region $R_i$ of image $I_f$ and the jth feature region $R_j$ of image $I_m$.

Figure 3:
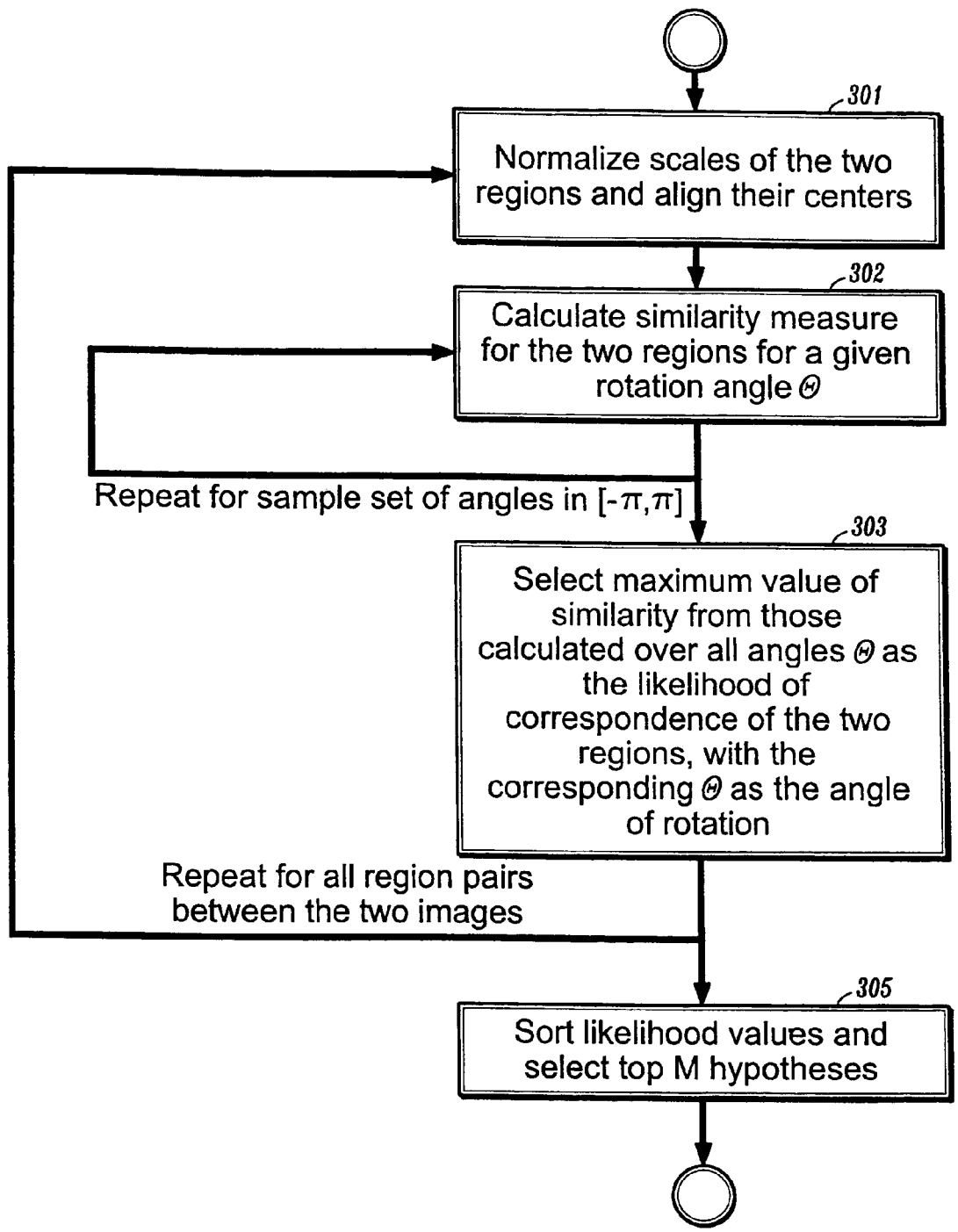
FIG. 3 depicts a flow chart of a preferred correspondence likelihood measurement method of the invention.

The next step 102 is to measure the likelihood of each hypothesized correspondence $C_{i,j}$ in order to match features between images. Referring now to FIG. 3, the likelihood of correspondence of an individual feature correspondence $C_{i,j}$, which can be denoted by $L_{local}(C_{i,j})$, can be determined by a similarity measure between the interior intensities of the two salient regions involved. Before measuring this similarity, however, it is preferable, at step 301, to normalize the scales of the two regions so that the smaller region matches the scale of the larger region, and to align the region centers. One method of normalizing the scale is based on the ratio of the respective best scales of the two regions, however, a preferred method is to supersample the smaller region. In order to account for the region in the moving image being rotated with respect to the region in the fixed image, one region can be rotated by a predetermined angle with respect to the other image. The similarity of the two regions can then be measured for the different offset angles. The angle for which the similarity measure has the largest value is the rotation angle of the two regions of interest, and that maximum value of the similarity measure can define the likelihood of correspondence of $C_{i,j}$.

A preferred similarity measure, referred to as the Entropy Correlation Coefficient ("ECC"), can be defined at step 302 as:

$$ECC(R_i, R_j^\Theta) = 2 - \frac{2H(R_i, R_j^\Theta)}{H(R_i) + H(R_j^\Theta)},$$

where H is the differential entropy previously defined, and $R_j^\Theta$ represents a scale normalized region $R_j$ after being rotated through an angle $\Theta$. The joint differential entropy $H(R_i, R_j^\Theta)$ can be defined as $$H(R_i, R_j^\Theta) = -\int_{R_i, R_j} p(R_i, R_j^\Theta) \log_2 p(R_i, R_j^\Theta) dI dJ,$$

where the domain of the integral is over the regions $R_i$ and $R_j^\Theta$, $p(R_i, R_j^\Theta)$ is a joint probability density of the image intensities in regions $R_i$ and $R_j^\Theta$, and I and J take on values in the set of possible intensity values in $I_f$ and $I_m$, respectively. $ECC(R_i, R_j^\Theta)$ is evaluated for a discrete set of angles $\Theta$ sampled over the range $[-\pi, \pi)$. In one preferred embodiment, rotation is sampled between $[-\pi, \pi)$ at an interval of $\pi/36$. At step 303, the maximum value of ECC evaluated over the set of angles is taken as the likelihood of correspondence of $C_{i,j}$. The $\Theta$ corresponding to maximum value of ECC is taken as the angle of rotation between the two feature regions of interest. Thus, one can define the likelihood of correspondence of $C_{i,j}$ as $$L_{Local}(C_{i,j}) = \max_\Theta ECC(R_i, R_j^\Theta).$$

The preferred similarity measure, ECC, is scaled to have values in the range (0,1), with 0 representing full independence between the two arguments, and 1 complete dependence between the arguments. In addition, ECC increases almost linearly as the relationship between the two arguments varies from complete independence to complete dependence. Using this ECC definition of likelihood, the likelihood values of all features correspondence hypotheses $C_{i,j}$, where $i,j \in [1, N_f] \times [1, N_m]$, are comparable. The likelihood values can then be sorted at step 305 in descending order, and the top M hypotheses are selected. This set of the top M hypotheses can be denoted as $top \lfloor C_{ij} \rfloor$. Preferred values of M are from 20 to 40. In addition, associated with each features correspondence hypothesis $C_{i,j}$ selected is a scaling factor, which can be estimated from the ratio of the scales as $\sigma = S_{x_i}/S_{y_j}$, a rotation angle as estimated above, and a translation vector $(t_x, t_y)$ which can be estimated from the displacement of the center of the two regions after rotation and scaling. The scaling factor, rotation angle, and transformation vector associated with each $C_{i,j}$ define a transformation $T_{C_{ij}}(I_m)$ of the moving image.

Figure 4:
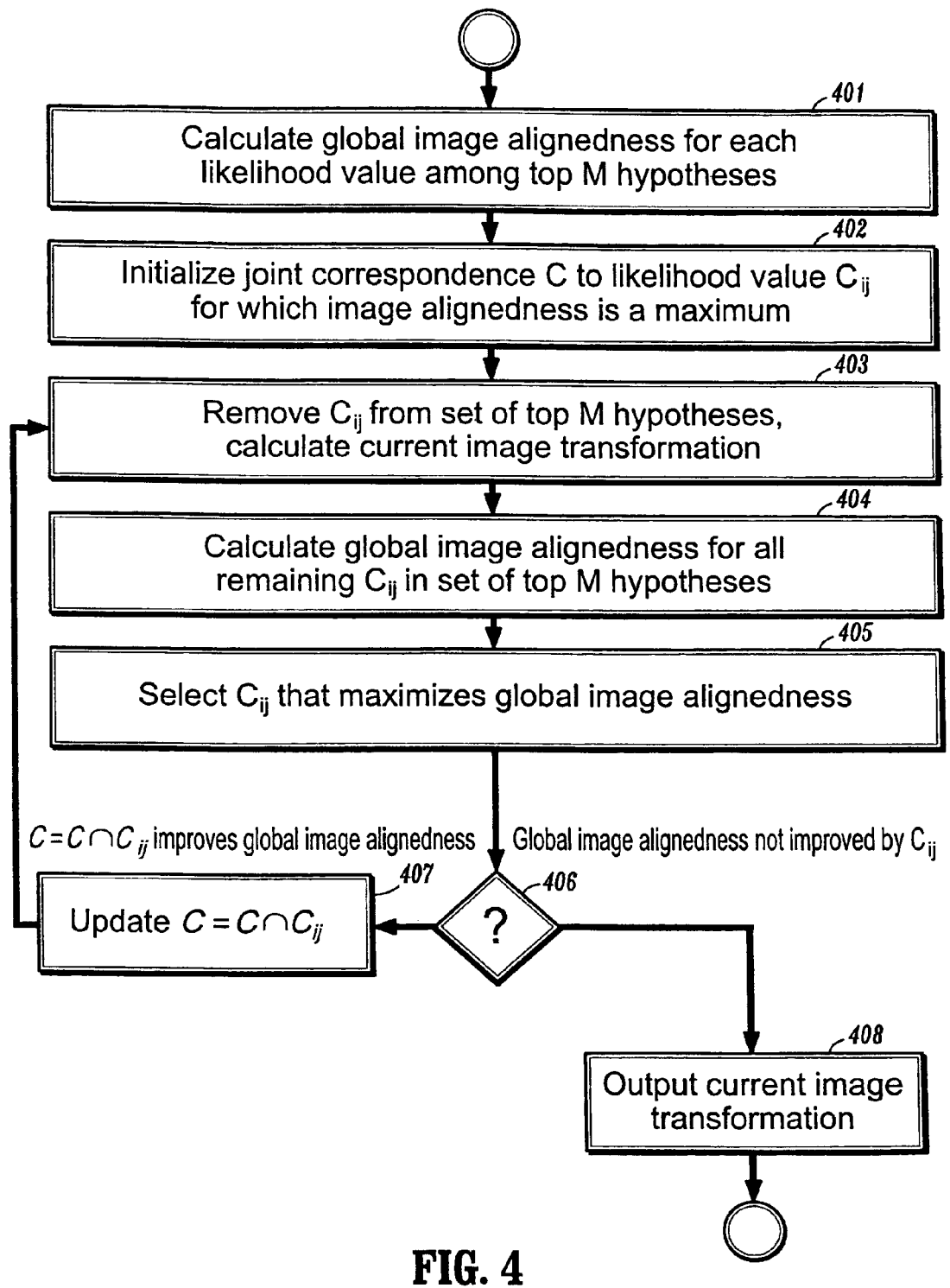
FIG. 4 depicts a flow chart of a preferred joint correspondence determination method of the invention.

The next step 103 is to determine a joint correspondence $C = C_{i_1 j_1} \cap C_{i_2 j_2} \cap \ldots \cap C_{i_k j_k}$ between multiple pairs of region features which results in a maximum likelihood in terms of global image alignedness. Referring now to FIG. 4, a preferred method of determining this joint correspondence uses an ECC measure calculated over overlapping portions of the fixed image $I_f$ and a transformed moving image $T_{C_{ij}}(I_m)$ to measure the global image alignedness:

$$L_{Global}(C_{ij}) = ECC(T_{C_{ij}}(I_m), I_f)$$

-continued $$= 2 - \frac{2H(T_{C_{ij}}(I_m), I_f)}{H(T_{C_{ij}}(I_m)) + H(I_f)}.$$

Here, H is is defined by $H(I)=-\int_I p_i(I)\log_2 p_i(I)di$, where I is an image, and $H(I_1,I_2)$ is defined as $$H(I_1, I_2) = -\int_{I_1,I_2} p(I_1, I_2)\log_2 p(I_1, I_2)di\,dj,$$

where the domain of the integral is over images $I_1$ and $I_2$, and $p(I_1,I_2)$ is a joint probability density of the image intensities in images $I_1$ and $I_2$, and i and j take on values in the set of possible intensity values in images $I_1$ and $I_2$, respectively.

The first step 401 in determining the joint correspondence is to loop over each $C_{i,j}$ in top$\lfloor C_{ij} \rfloor$, and for each $C_{i,j}$ calculate $L_{Global}(C_{ij})$. The joint correspondence C is initialized at step 402 to the $C_{i,j}$ for which $L_{Global}(C_{ij})$ is a maximum. At step 403, this $C_{i,j}$ is then removed from the set top$\lfloor C_{ij} \rfloor$, and the current image transformation $T_{C_{ij}}$ is calculated. In a preferred embodiment, the feature region centers used in calculating the transformation can be refined to achieve sub-pixel accuracy for better matching.

In the next step 404, the remaining $C_{i,j}$ in top$\lfloor C_{ij} \rfloor$ are looped over, and for each $C_{i,j}$ the $L_{Global}(C \cap C_{ij})$ is calculated. The $C_{ij}$ that maximizes $L_{Global}(C \cap C_{ij})$ is selected at step 405. The addition of the new $C_{ij}$ to the joint correspondence C should increase the global alignedness. Thus, at step 406, if $L_{Global}(C \cap C_{ij}) > L_{Global}(C)$, the joint correspondence C is updated as $C \cap C_{ij}$ at step 407 and the method returns to step 403 where $C_{ij}$ is removed from top$\lfloor C_{ij} \rfloor$, and the image transformation is recomputed using the new joint correspondence. In addition, the feature region centers used in calculating the transformation can be refined to achieve sub-pixel accuracy for better matching. The remaining $C_{i,j}$ in top$\lfloor C_{ij} \rfloor$ are again looped over at step 404 and the selection and test are repeated.

If the global image alignedness is not improved by the addition of $C_{ij}$ to the joint correspondence C, the current transformation T is output at step 408 as the converged transformation that aligns the moving image $I_m$ to the fixed image $I_f$.

Analytical Tests on Simulated Moving Images:

A series of controlled experiments were conducted using a pair of brain images with the moving image simulated from a known transform. The first image is a proton density (PD) weighted MR brain image (see FIG. 6, I.a), and the second image is a T1 weighted MR brain image (see FIG. 6, I.b). The two images are originally registered, and the size of the images is 217×181. These experiments were conducted on a 2 GHz PC workstation with a preferred registration method implemented in Matlab with several functions written in C++.

Experiment 1:

In the first controlled experiment, the invariance properties with respect to scaling, rotation, and translation are studied. The PD image is used as the fixed image, and different moving images are simulated by artificially transforming the T1 image with controlled parameters. The parameters are chosen according to the following four cases:

Case 1: Invariance to scaling. Vary the scale factor σ in the range [0.5, 1.5], while holding fixed the translation ($t_x$=0, $t_y$=0) and rotation (Θ=0).

Case 2: Invariance to rotation. Vary the rotation angle Θ in the range $$[-\frac{\pi}{2}, \frac{\pi}{2}],$$

while holding fixed the translation ($t_x$=0, $t_y$=0) and scaling factor (Θ=1).

Case 3: Invariance to translation. Vary the translation parameters ($t_x$,$t_y$) in the range [−50,50], while holding fixed the rotation Θ and scale factor σ.

Case 4: the combined effect of the transformation parameters. Vary all parameters simultaneously: ($t_x$,$t_y$) in the range [−50, 50], σ in the range [0.5, 1.5], and Θ in the range $$[-\frac{\pi}{2}, \frac{\pi}{2}].$$

In each case, 50 simulated moving images are generated, and the registration algorithm is applied to register the fixed image with each simulated moving image respectively. Since the true transformation that was used to simulate each moving image is known, the true transformation can be compared with the recovered transformation parameters.

Three statistical performance measures were computed from the study and the results are listed in Table 1, below. The first measure is the percentage of correctness. In a registration trial, if the recovered transformation is sufficiently close to the true transformation, this trial results in a correct registration, otherwise, it is taken as a false registration case. In a preferred embodiment, the recovered transformation is considered correct if its difference from the true transformation is less than a pre-defined error threshold. Typically, the threshold is set as follows: scale error less than 0.05, rotation angle error less than 5 degrees, and translation errors less than ($D_x$/50, $D_y$/50) in the x and y directions, where $D_x$ and $D_y$ are the dimensions of the image along x and y directions, respectively. The second measure is the average error. This measure gives the average error (i.e., difference) of the recovered transformation parameters from the true transformation parameters. It reflects the accuracy and convergence property of the registration method. The last measure is the average execution time for one trial of registering a pair of fixed and moving images.

TABLE 1

|  | Correctness | Error | Time |
| --- | --- | --- | --- |
| Case 1 | 98% | (0.9, 1.1, 0.027, 0.0) | 138 s |
| Case 2 | 100% | (0.5, 0.6, 0.009, 1.5) | 155 s |
| Case 3 | 100% | (0.2, 0.4, 0.000, 0.0) | 155 s |
| Case 4 | 94% | (1.4, 1.7, 0.031, 2.1) | 150 s |

For each case, the percentage of correctness, the average error in the recovered transformation parameters, and the average execution time for one trial are given. The given errors are in the format: ($t_x$, $t_y$, Θ, σ) where translation errors $t_x$, $t_y$, are in pixels, the rotation angle errors Θ are in degrees, and the scaling errors σ are given relative to the original image scale. The times are given in seconds.

Experiment 2:

In the second controlled experiment, robustness with respect to image noise is studied. The original PD image is used as the fixed image, and test moving images were generated by adding different levels of Gaussian noise to the original T1 image, and transforming the noise corrupted images according to random transformations. The Gaussian noise added has zero mean with standard deviation $\lambda$. All possible values for the standard deviation are between [0, 255]. Table 2 displays the three performance measures for three test cases. The three cases differ by the range of the standard deviation of the Gaussian noise added. For each case, 30 noise corrupted T1 images are generated and randomly transformed, where the transformation parameters vary in the same ranges as in the first controlled experiment. From the results, one can see that a preferred method is quite robust to high levels of noise. This is partly due to the stability of the entropy-based feature region detector and the robustness of the intensity-based ECC similarity measure. It is also due to the fact that only a small number of good matched features are required to register the images.

TABLE 2

| Range of $\lambda$ | Correctness | Error | Time |
| --- | --- | --- | --- |
| [5, 10] | 100% | (0.3, 0.6, 0.007, 0.4) | 142 s |
| [10, 20] | 97% | (0.7, 0.9, 0.0006, 1.2) | 142 s |
| [20, 30] | 90% | (0.9, 1.3, 0.009, 2.4) | 144 s |

The cases in the table differ by the range of the standard deviation $\lambda$ of the Gaussian noise added. For each case, three statistical measures are given in the same format as in Table 1.

Figure 6:
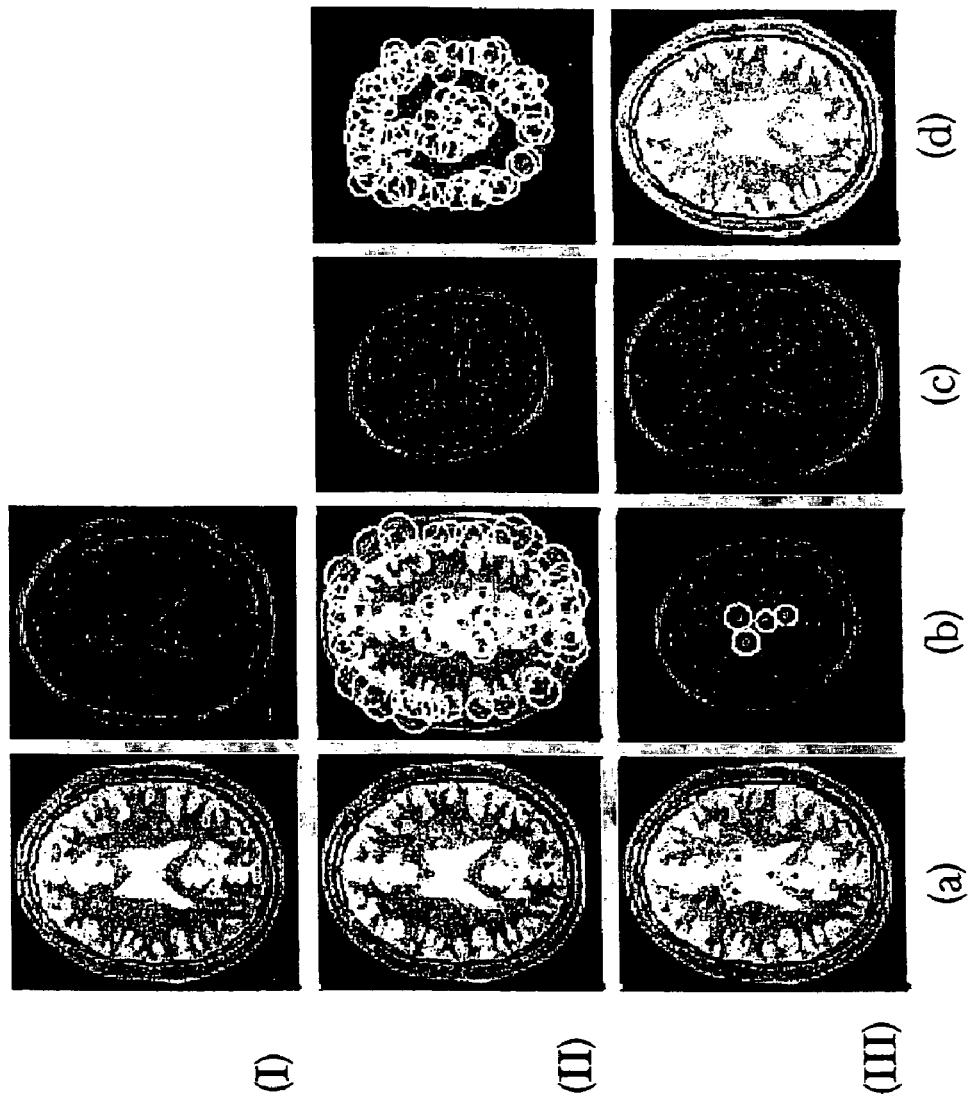
FIG. 6 depicts the registration of a pair of brain images used in a simulation experiment.

FIG. 6 depicts one pictorial example selected from the simulated experiments. The fixed image is shown at (II.a), salient feature regions on the fixed image are shown at (II.b), the moving image is shown at (II.c), and salient feature regions on the moving image are shown at (II.d). In this example, the moving image is generated by adding Gaussian noise with zero mean, standard deviation 25 to the original T1-weighted image, then scaling down the image by 20%, and rotating by 20 degrees. The feature pairs in the joint correspondence chosen upon convergence are shown at (III.a-b). The transformed moving image is shown at (III.c). The edge superimposed map after registration, with edges from the transformed image superimposed on the fixed image, are shown at (III.d).

Figure 7:
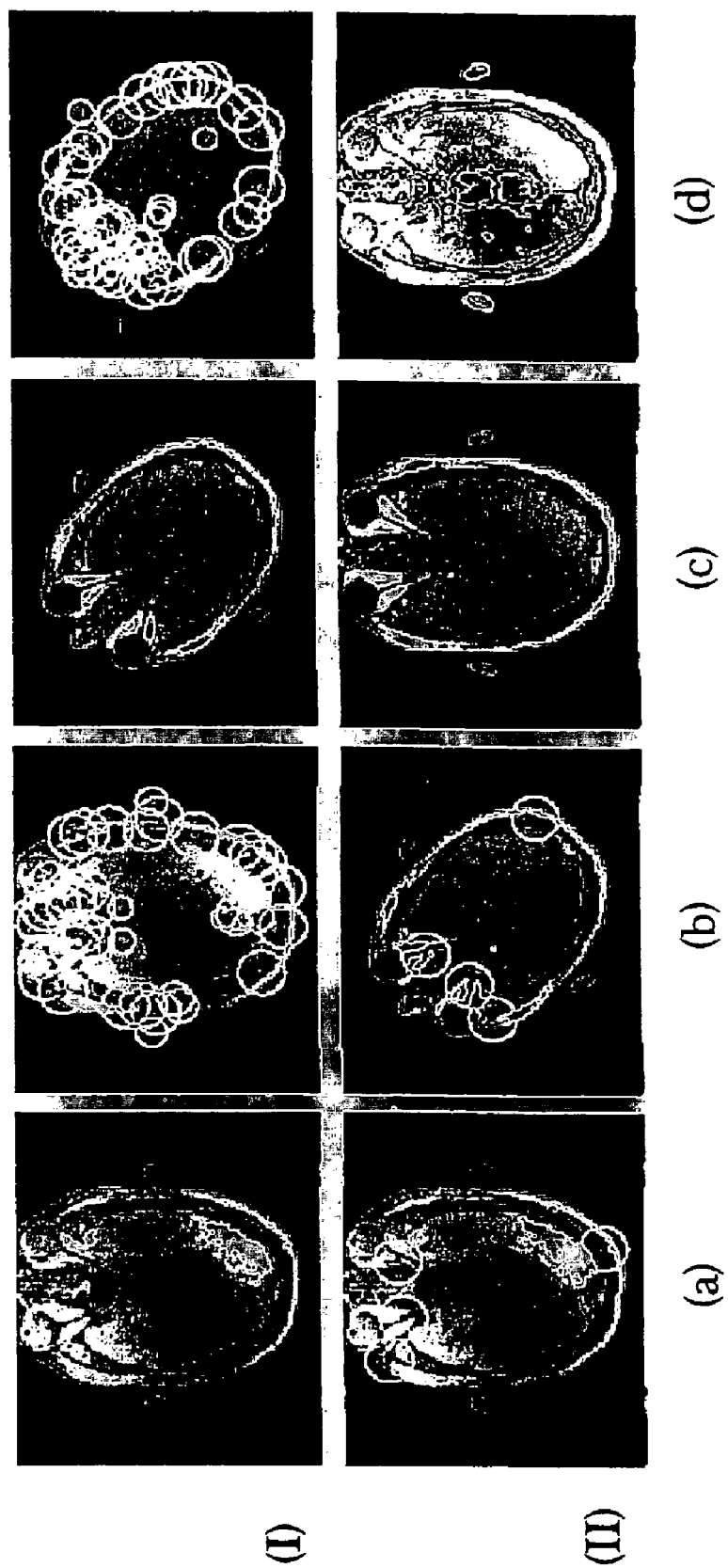
FIG. 7 depicts the registration of a pair of brain images used in a real experiment.

Analytical Tests on Real Images:

FIG. 7 shows the result of registering two real brain images. The fixed image is shown at (I.a). Salient feature regions detected on the fixed image are shown at (I.b). The moving image is shown at (I.c). Salient feature regions on the moving image are shown at (I.d). The corresponding feature pairs chosen upon convergence are shown at (II.a-b). The transformed moving image is shown at (II.c). Edges from the transformed moving image are superimposed on the fixed image, as shown in (II.d). Note that the invention successfully picks up several distinctive feature regions, and is able to recover the large rotation between the two images.

Figure 8:
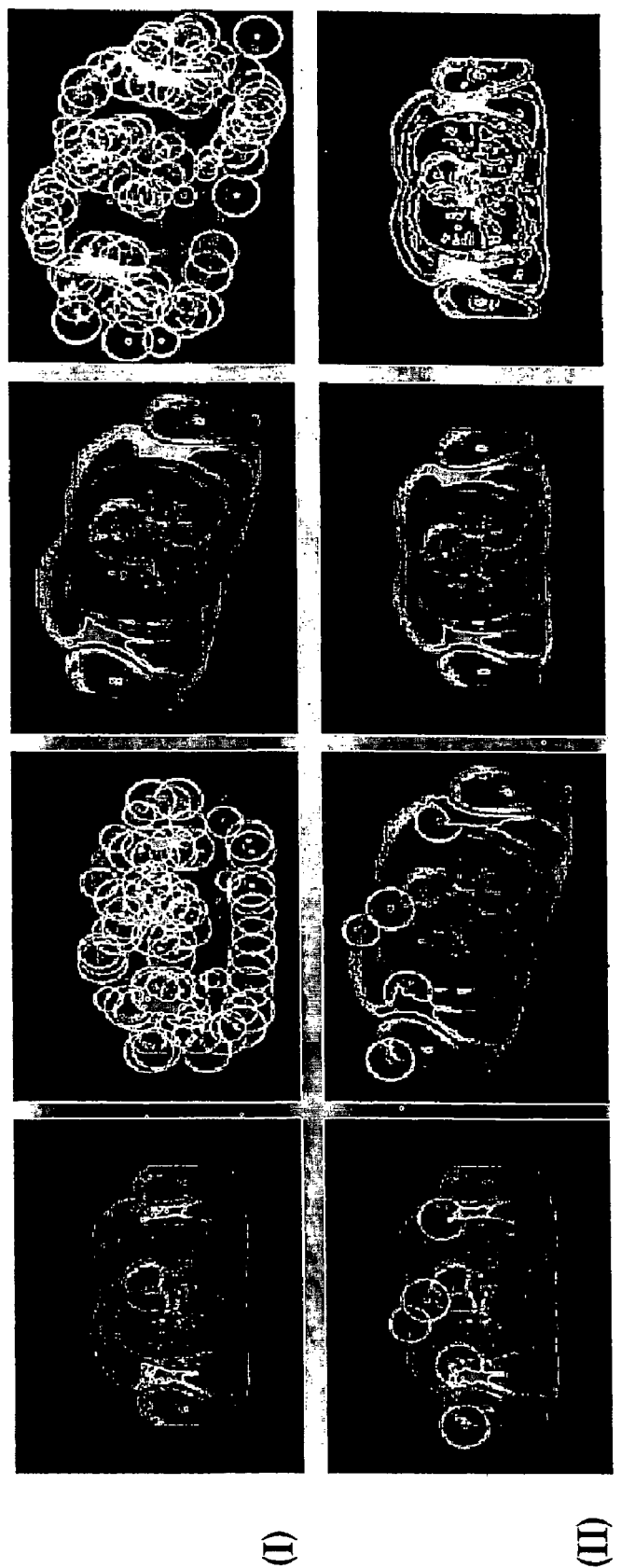
FIG. 8 depicts the registration of a pair of chest MR images.

FIG. 8 shows the registration of two MR chest images. The fixed image is a T1-weighted MR image, and the moving image is a PD-weighted MR image. The layout of the images is the same as in FIG. 5. Despite the different tissue intensity characteristics between the two images, the salient feature region pairs chosen by the method to recover the transformation parameters correspond very well both in scale and location.

Figure 9:
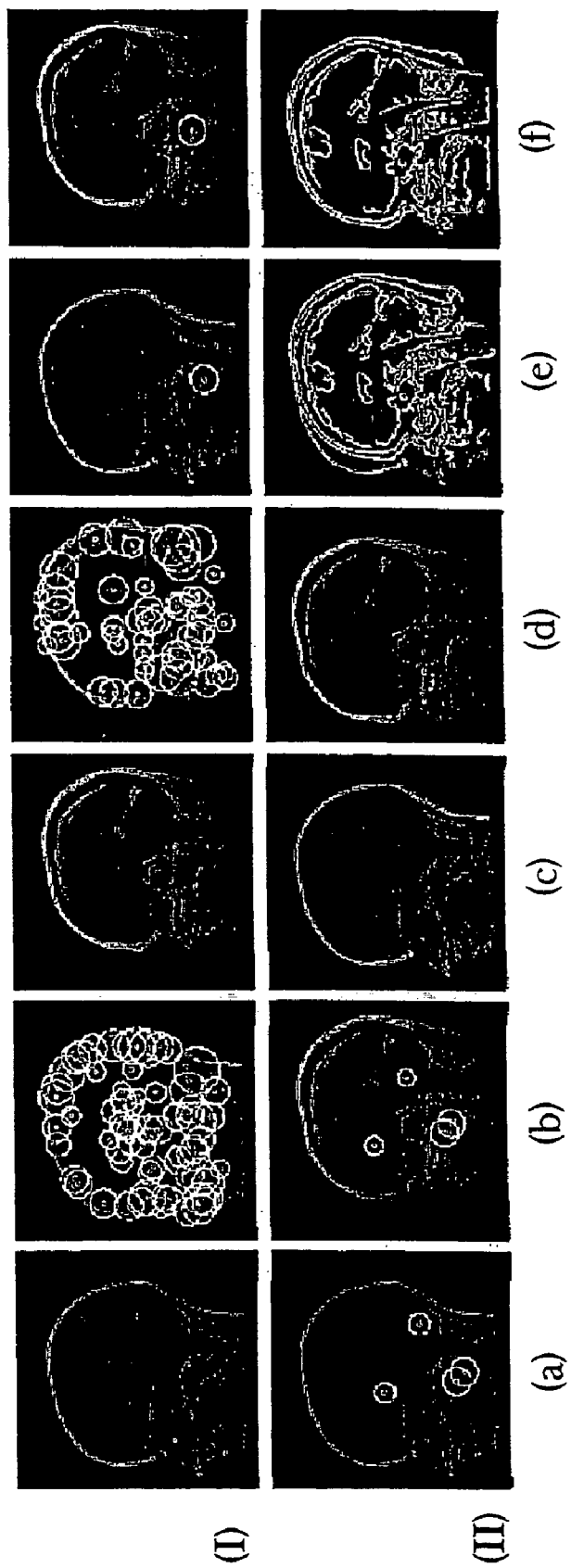
FIG. 9 depicts the registration of a pair of brain images with a brain tumor.

FIG. 9 shows the results of the registration method on images with appearing and disappearing structures. A pair of brain images is used, one of which contains a tumor. The fixed image is shown at (I.a), salient feature regions detected on the fixed image are shown at (I.b), the moving image is shown at (I.c), and the salient feature regions on the moving image are shown at (I.d). The first corresponding feature pair chosen is shown at (I.e-f). The corresponding feature pairs chosen upon convergence is shown at (II.a-b). The registration result is shown at (II.c-d), with (II.c) the fixed image, and (II.d) the transformed moving image. Comparison of the edge superimposed maps is shown at (II.e-f), with edges from the original moving image superimposed on the fixed image at (II.e), and edges from the transformed moving image superimposed on the fixed image at (II.f). The two images are from two different subjects, and the tumor in one of the images changes its appearance significantly. Here the feature-based aspect of a preferred method enables it to focus on regions of similar appearance within a natural scale, thus being robust to the appearance and disappearance of local structures.

Figure 10:
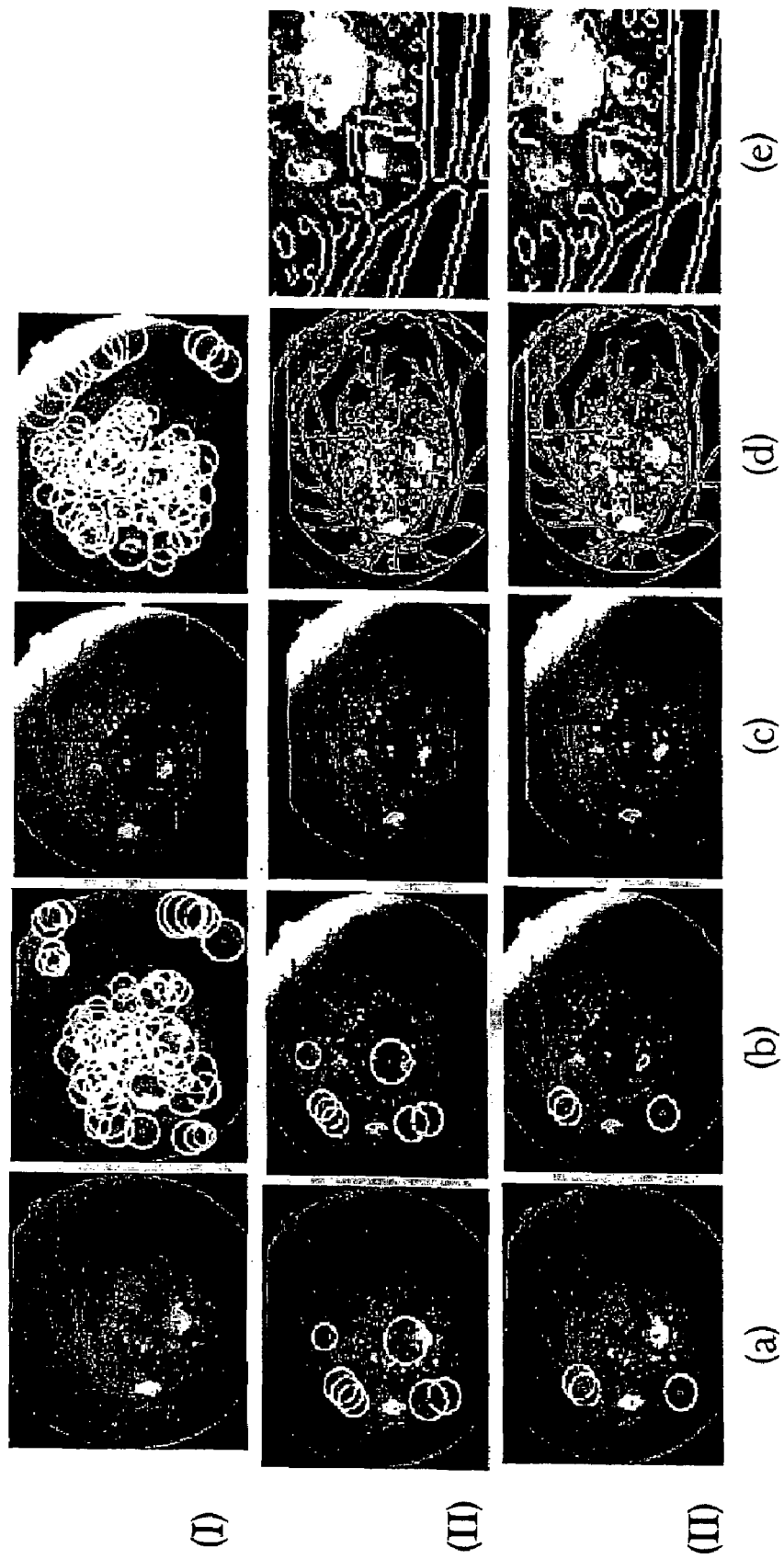
FIG. 10 depicts the registration of two curved human retinal images.

FIG. 10 show the results of a preferred method on robust partial matching and mosaicing applications. A pair of curved human retinal images is used. The fixed image is shown at (I.a), salient feature regions on the fixed image are shown at (I.b), the moving image is shown at (I.c), and salient feature regions on the moving image are shown at (I.d). This example shows the importance of incrementally selecting good feature correspondences that increase the matching similarity and guarantee convergence. Feature pairs are handpicked that seem to correspond to each other well, as shown in (II.a-b). This results in seven feature pairs, and the moving image is transformed using the transformation recovered by these feature pairs. The transformed moving image using the seven hand-picked feature correspondences is shown at (II.c), edges of the transformed moving image superimposed on the fixed image are shown at (II.d), and a zoom in view of (II.d) is shown at (II.e). In row III, the feature correspondences automatically chosen are shown. The corresponding feature pairs automatically chosen by the algorithm upon convergence are shown at (III.a-b). There are only three best feature pairs chosen. The transformed moving image is shown at (III.c), edges of the transformed moving image superimposed on the fixed image are shown at (III.d), and a zoom in view of (III.d) is shown at (III.e). Comparing the edge superimposed maps, one can see that the three feature pairs chosen produce a better transformation than using all seven handpicked feature pairs. The comparison can be seen more clearly from the two zoom-in views of the edge superimposed maps: (II.e) vs. (III.e).

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 11:
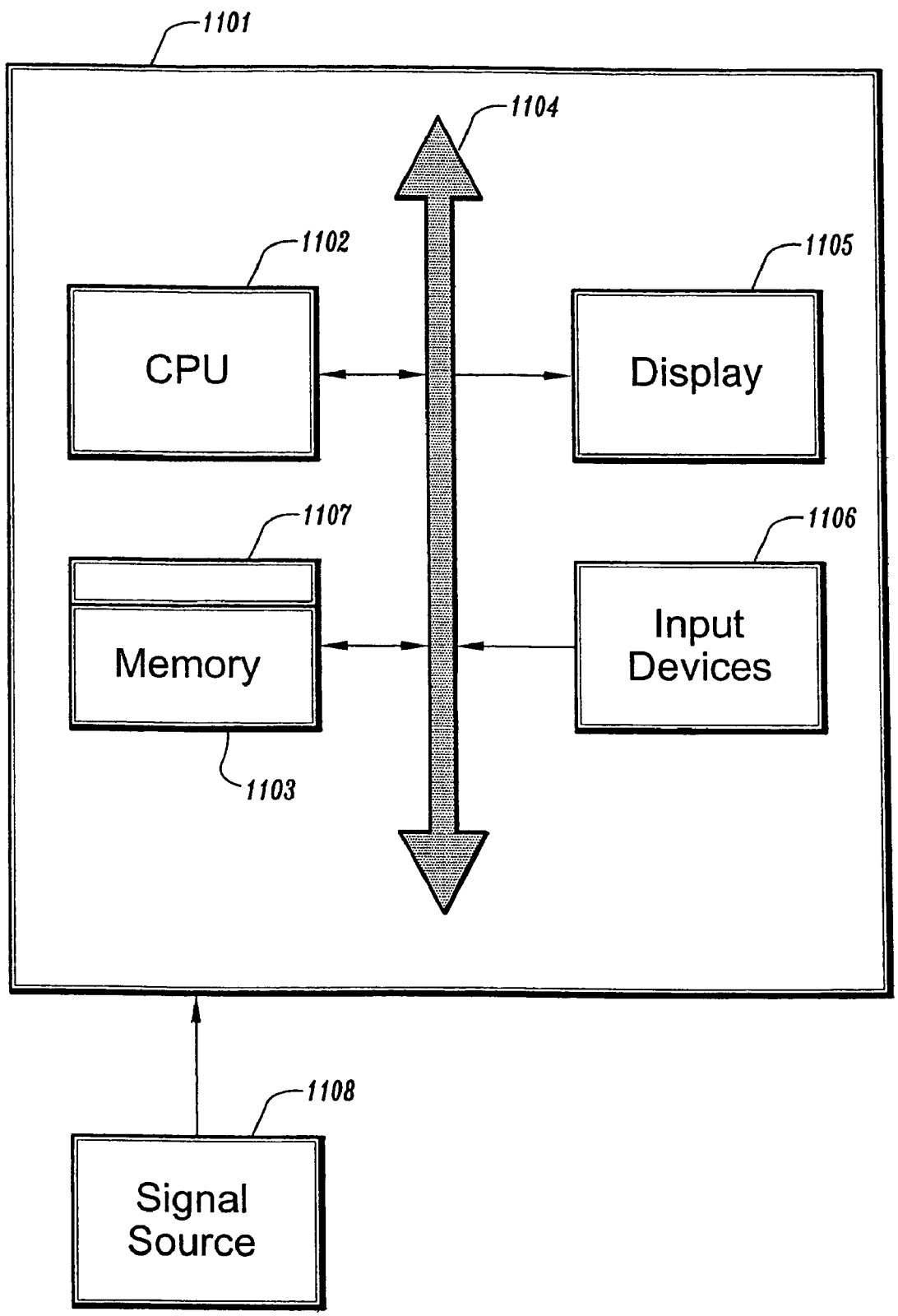
FIG. 11 depicts an exemplary computer system for implementing a preferred embodiment of the invention.

Referring now to FIG. 11, according to an embodiment of the present invention, a computer system 1101 for implementing the present invention can comprise, inter alia, a central processing unit (CPU) 1102, a memory 1103 and an input/output (I/O) interface 1104. The computer system 1101 is generally coupled through the I/O interface 1104 to a display 1105 and various input devices 1106 such as a mouse and a keyboard. The support circuits can include circuits such as cache, power supplies, clock circuits, and a communication bus. The memory 1103 can include random access memory (RAM), read only memory (ROM), disk drive, tape drive, etc., or a combinations thereof. The present invention can be implemented as a routine 1107 that is stored in memory 1103 and executed by the CPU 1102 to process the signal from the signal source 1108. As such, the computer system 1101 is a general purpose computer system that becomes a specific purpose computer system when executing the routine 1107 of the present invention.

The computer system 1101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of aligning a pair of images comprising the steps of:
   providing a pair of images with a first image and a second image, wherein said images comprise a plurality of intensities corresponding to a domain of points in a D-dimensional space,
   identifying salient feature regions in both the first image and the second image, including computing, for each pixel x in one image in the pair of images, a local entropy for one or more regions of scale s about pixel x;
   selecting a region that maximizes said local entropy for each pixel x as a best region about x;
   determining a saliency measure for the best region about each pixel x;
   identifying those pixels with local maxima of the saliency measure; and
   selecting those feature regions with a greatest local maxima of the saliency measure as salient feature regions of interest;
   hypothesizing a correspondence between each pair of salient feature regions, wherein a first region of each pair is on the first image and a second region of each pair is on the second image;
   measuring the likelihood of the hypothesized correspondence of each pair of feature regions; and
   determining a joint correspondence from a set of pairs of feature regions with the greatest likelihood of correspondence.

2. The method of claim 1, wherein the steps of computing, selecting a region, determining, identifying, and selecting feature regions are repeated for the other image of the pair of images.

3. The method of claim 1, wherein said local entropy of the region of scale s about pixel x is defined as $$H(s,x) = -\int_R p_i(s,x)\log_2(s,x)di,$$

where R is the region, i takes on values in the set of possible intensity values in R, and $p_i(s,x)$ is a probability density of the image intensities in the region R.

4. The method of claim 3, wherein said saliency measure is defined by $$A(S_x, x) = H(S_x, x) \cdot S_x \cdot \int_R \left\| \frac{\partial}{\partial s} p_i(s, x) \right|_{S_x} \right\| di$$

wherein $S_x$ is the scale of the best region R about pixel x.

5. The method of claim 1, wherein the step of measuring the likelihood of the hypothesized correspondence of each pair of feature regions further comprises:
   for each pair of regions,
      for each angle Θ in a set of angles, calculating a similarity measure for the two regions as a function of the angle Θ; and
      selecting the maximum value of the similarity measure over the set of angles as the likelihood of correspondence of the two regions, wherein the angle Θ corresponding to the maximum value is an angle of rotation between the two regions; and
   selecting those pairs of regions with a maximum likelihood of correspondence as the set of regions with the greatest likelihood of correspondence.

6. The method of claim 5, wherein the angles Θ are samples over the range $[-\pi, \pi)$ at an interval of $\pi/36$.

7. The method of claim 5, further comprising providing each region with an associated scale and center, and for each pair of regions, prior to calculating the similarity measure, normalizing the scale of the two regions and aligning their centers.

8. The method of claim 7, wherein the scale of the two regions is normalized by supersampling the smaller region.

9. The method of claim 5, wherein similarity measure for the two regions is defined by $$ECC(R_i, R_j^\Theta) = 2 - \frac{2H(R_i, R_j^\Theta)}{H(R_i) + H(R_j^\Theta)},$$

where $R_i$ is the first region, $R_j^\Theta$ is the second region rotated by an angle Θ, H is is defined by $H(R) = -\int_R p_i(R)\log_2 p_i(R)di$ where R is the region, i takes on values in the set of possible intensity values in R, and $p_i(R)$ is a probability density of the image intensities in the region R, $H(R_i, R_j^\Theta)$ is defined as $$H(R_i, R_j^\Theta) = -\int_{R_i, R_j^\Theta} p(R_i, R_j^\Theta) \log_2 p(R_i, R_j^\Theta) dI dJ,$$

where the domain of the integral is over the regions $R_i$ and $R_j^\Theta$, $p(R_i, R_j^\Theta)$ is a joint probability density of the image intensities in regions $R_i$ and $R_j^\Theta$, and I and J take on values in the set of possible intensity values in the first and second images, respectively.

10. The method of claim 1, wherein the step of determining a joint correspondence from pairs of feature regions further comprises:

calculating a global image alignedness for each pair of regions from the set of greatest likelihood of correspondence, wherein the global image alignedness of a hypothesized feature correspondence $C_{ij}$ is defined as $$L_{Global}(C_{ij}) = 2 - \frac{2H(T_{C_{ij}}(I_m), I_f)}{H(T_{C_{ij}}(I_m)) + H(I_f)},$$

wherein $I_f$ is the first image, $I_m$ is the second image, $T_{C_{ij}}(I_m)$ is the transformed image corresponding the hypothesized feature correspondence $C_{ij}$, H is is defined by $H(I) = -\int_i p_i(I) \log_2 p_i(I) di$, where I is an image, i takes on values in the set of possible intensity values in I, $p_i(I)$ is a probability density of the image intensities in the image I, and $H(I_1, I_2)$ for two images $I_1, I_2$ is defined as $$H(I_1, I_2) = -\int_{I_1, I_2} p(I_1, I_2) \log_2 p(I_1, I_2) di dj,$$

where the domain of the integral is over images $I_1$ and $I_2$, $p(I_1, I_2)$ is a point probability density of the image intensities in images $I_1$ and $I_2$, and i and j take on values in the set of possible intensity values in images $I_1$ and $I_2$, respectively;

initializing the joint correspondence C to a correspondence likelihood value $C_{ij}$ from the set with a greatest likelihood of correspondence with a maximum global image alignedness;

removing the $C_{ij}$ from the set of greatest likelihood of correspondences;

calculating a current image transformation from the joint correspondence;

calculating the global image alignedness for each remaining pair of regions in the set of greatest likelihood of correspondence;

selecting a new correspondence likelihood value $C_{ij}$ with a maximum global image alignedness;

calculating the global image alignedness for a combination of the joint correspondence C and the new correspondence likelihood value $C_{ij}$, wherein if the global image alignedness is improved by the combination of the joint correspondence C and the new correspondence likelihood value $C_{ij}$, the joint correspondence is updated and the steps of removing, calculating a current image transformation, calculating a global image alignedness, selecting, and calculating the improved global image alignedness are repeated.

11. The method of claim 10, further comprising the step of, if the global image alignedness is not improved by the combination of the joint correspondence C and the new correspondence likelihood value $C_{ij}$, outputting the current image transformation as a transformation that aligns the two images.

12. The method of claim 10, further comprising refining region feature centers used in calculating the current image transformation to achieve sub-pixel accuracy.

13. The method of claim 10, wherein the joint correspondence C is updated by $C_{ij}$ as $C \cap C_{ij}$.

14. A method of aligning a pair of images comprising the steps of:

providing a pair of images with a first image and a second image, wherein said images comprise a plurality of intensities corresponding to a domain of points in a D-dimensional space;

identifying salient feature regions in both the first image and the second image;

hypothesizing a correspondence between each pair of salient feature regions, wherein a first region of each pair is in the first image and a second region of each pair is in the second image;

for each pair of salient feature regions, for each angle $\Theta$ in a set of angles, calculating a similarity measure for the two regions as a function of the angle $\Theta$; and selecting a maximum value of the similarity measure over the set of angles as the likelihood of correspondence of the two regions, wherein the angle $\Theta$ corresponding to the maximum value is an angle of rotation between the two regions;

selecting those pairs of regions with a maximum likelihood of correspondence as the set of regions with the greatest likelihood of correspondence; and determining a joint correspondence from a set of pairs of feature regions with the greatest likelihood of correspondence.

15. The method of claim 14, wherein identifying salient feature regions comprises computing, for each pixel x in each image of the pair of images, a local entropy for one or more regions of scale s about pixel x;

selecting a region that maximizes said local entropy for each pixel x as a best region about x;

determining a saliency measure for the best region about each pixel x;

identifying those pixels with local maxima of the saliency measure;

selecting feature regions with a greatest local maxima of the saliency measure as salient feature regions of interest in each image, wherein the steps of computing a local entropy, selecting a region, determining a saliency measure, identifying pixels, and selecting feature regions are repeated for the other image of the pair of images.

16. The method of claim 14, wherein said local entropy of the region of scale s about pixel x is defined as $$H(s,x) = -\int_R p_i(s,x) \log_2(s,x) di,$$

where R is the region, i takes on values in the set of possible intensity values in R, and $p_i(s,x)$ is a probability density of the image intensities in the region R.

17. The method of claim 16, wherein said saliency measure is defined by $$A(S_x, x) = H(S_x, x) \cdot S_x \cdot \int_R \left\| \frac{\partial}{\partial s} p_i(s, x) \big|_{S_x} \right\| di$$

wherein $S_x$ is the scale of the best region R about pixel x.

18. The method of claim 14, wherein the angles $\Theta$ are samples over the range $[-\pi, \pi)$ at an interval of $\pi/36$.

19. The method of claim 14, further comprising providing each region with an associated scale and center, and for each pair of regions, prior to calculating the similarity measure, normalizing the scale of the two regions and aligning their centers.

20. The method of claim 19, wherein the scale of the two regions is normalized by supersampling the smaller region.

21. The method of claim 14, wherein the similarity measure for the two regions is defined by $$ECC(R_i, R_j^\Theta) = 2 - \frac{2H(R_i, R_j^\Theta)}{H(R_i) + H(R_j^\Theta)},$$

where $R_i$ is the first region, $R_j^\Theta$ is the second region rotated by an angle $\Theta$, H is is defined by $H(R) = -\int_R p_i(R) \log_2 p_i(R) di$ where R is the region, i takes on values in the set of possible intensity values in R, and $p_i(R)$ is a probability density of the image intensities in the region R, $H(R_i, R_j^\Theta)$ is defined as $$H(R_i, R_j^\Theta) = -\int_{R_i, R_j^\Theta} p(R_i, R_j^\Theta) \log_2 p(R_i, R_j^\Theta) dI dJ,$$

where the domain of the integral is over the regions $R^i$ and $R_j^\Theta$, $p(R_i, R_j^\Theta)$ is a joint probability density of the image intensities in regions $R_i$ and $R_j^\Theta$, and I and J take on values in the set of possible intensity values in the first and second images, respectively.

22. The method of claim 14, further comprising the step of, if the global image alignedness is not improved by the combination of the joint correspondence C and the new correspondence likelihood value $C_{ij}$, outputting the current image transformation as a transformation that aligns the two images.

23. The method of claim 14, further comprising refining region feature centers used in calculating the current image transformation to achieve sub-pixel accuracy.

24. The method of claim 14, wherein determining a joint correspondence from pairs of feature regions comprises:
calculating a global image alignedness for each pair of regions from the set of greatest likelihood of correspondence, wherein the global image alignedness of a hypothesized feature correspondence $C_{ij}$ is defined as $$L_{Global}(C_{ij}) = 2 - \frac{2H(T_{C_{ij}}(I_m), I_f)}{H(T_{C_{ij}}(I_m)) + H(I_f)},$$

wherein $I_f$ is the first image, $I_m$ is the second image, $T_{C_{ij}}(I_m)$ is the transformed image corresponding the hypothesized feature correspondence $C_{ij}$, H is is defined by $H(I) = -\int_i p_i(I) \log_2 p_i(I) di$, where I is an image, i takes on values in the set of possible intensity values in I, $p_i(I)$ is a probability density of the image intensities in the image I, and $H(I_1, I_2)$ for two images $I_1, I_2$ is defined as $$H(I_1, I_2) = -\int_{I_1, I_2} p(I_1, I_2) \log_2 p(I_1, I_2) dI dJ,$$

where the domain of the integral is over images $I_1$ and $I_2$, $p(I_1, I_2)$ is a joint probability density of the image intensities in images $I_1$ and $I_2$, and i and j take on values in the set of possible intensity values in images $I_1$ and $I_2$, respectively;
initializing the joint correspondence C to a correspondence likelihood value $C_{ij}$ from the set of greatest likelihood of correspondence with a maximum global image alignedness;
removing the $C_{ij}$ from the set of greatest likelihood of correspondence;
calculating a current image transformation from the joint correspondence;
calculating the global image alignedness for each remaining pair of regions in the set of greatest likelihood of correspondence;
selecting a new correspondence likelihood value $C_{ij}$ with a maximum global image alignedness;
calculating the global image alignedness for a combination of the joint correspondence C and the new correspondence likelihood value $C_{ij}$, wherein if the global image alignedness is improved by the combination of the joint correspondence C and the new correspondence likelihood value $C_{ij}$, the joint correspondence is updated and the steps of removing, calculating a current image transformation, calculating a global image alignedness, selecting, and calculating the improved global image alignedness are repeated.

25. The method of claim 14, wherein the joint correspondence C is updated by $C_{ij}$ as $C \cap C_{ij}$.

26. A computer readable program storage device, tangibly embodying a program of instructions executable by the computer to perform the method steps for transforming a first image of a pair of images into a second image of said pair, wherein said images comprise a plurality of intensities corresponding to a domain of points in a D-dimensional space, said method comprising the steps of:
identifying salient feature regions in both the first image and the second image, including computing, for each pixel x in one image in the pair of images, a local entropy for one or more regions of scale s about pixel x;
selecting a region that maximizes said local entropy for each pixel x as a best region about x;
determining a saliency measure for the best region about each pixel x;
identifying those pixels with local maxima of the saliency measure; and
selecting feature regions with a greatest local maxima of the saliency measure as salient feature regions of interest;
hypothesizing a correspondence between each pair of salient feature regions, wherein a first region of each pair is on the first image and a second region of each pair is on the second image;

measuring the likelihood of the hypothesized correspondence of each pair of feature regions; and determining a joint correspondence from a set of pairs of feature regions with the greatest likelihood of correspondence.

27. The computer readable program storage device of claim 26, wherein the method steps of computing, selecting a region, determining, identifying, and selecting feature regions are repeated for the other image of the pair of images.

28. The computer readable program storage device of claim 26, wherein said local entropy of the region of scale s about pixel x is defined as $$H(s,x) = -\int_R p_i(s,x)\log_2 p_i(s,x)di,$$

where R is the region, i takes on values in the set of possible intensity values in R, and $p_i(s, x)$ is a probability density of the image intensities in the region R.

29. The computer readable program storage device of claim 28, wherein said saliency measure is defined by $$A(S_x, x) = H(S_x, x) \cdot S_x \cdot \int_R \left\| \frac{\partial}{\partial s} p_i(s, x) \right|_{S_x} \right\| di$$

wherein $S_x$ is the scale of the best region R about pixel x.

30. The computer readable program storage device of claim 26, wherein the method step of measuring the likelihood of the hypothesized correspondence of each pair of feature regions further comprises:

for each pair of regions,
for each angle $\Theta$ in a set of angles, calculating a similarity measure for the two regions as a function of the angle $\Theta$; and selecting the maximum value of the similarity measure over the set of angles as the likelihood of correspondence of the two regions, wherein the angle $\Theta$ corresponding to the maximum value is an angle of rotation between the two regions; and selecting those pairs of regions with a maximum likelihood of correspondence as the set of regions with the greatest likelihood of correspondence.

31. The computer readable program storage device of claim 30, wherein the angles $\Theta$ are samples over the range $[-\pi, \pi)$ at an interval of $\pi/36$.

32. The computer readable program storage device of claim 30, the method further comprising the step of providing each region with an associated scale and center, and for each pair of regions, prior to calculating the similarity measure, normalizing the scale of the two regions and aligning their centers.

33. The computer readable program storage device of claim 32, wherein the scale of the two regions is normalized by supersampling the smaller region.

34. The computer readable program storage device of claim 30, wherein similarity measure for the two regions is defined by $$ECC(R_i, R_j^\Theta) = 2 - \frac{2H(R_i, R_j^\Theta)}{H(R_i) + H(R_j^\Theta)},$$

where $R_i$ is the first region, $R_j^\Theta$ is the second region rotated by an angle $\Theta$, H is is defined by $H(R) = -\int_R p_i(R)\log_2 p_i(R)di$ where R is the region, i takes on values in the set of possible intensity values in R, and $p_i(R)$ is a probability density of the image intensities in the region R, $H(R_i, R_j^\Theta)$ is defined as $$H(R_i, R_j^\Theta) = -\int_{R_i, R_j^\Theta} p(R_i, R_j^\Theta)\log_2 p(R_i, R_j^\Theta)dIdJ,$$

where the domain of the integral is over the regions $R_i$ and $R_j^\Theta$, $p(R_i, R_j^\Theta)$ is a joint probability density of the image intensities in regions $R_i$ and $R_j^\Theta$, and I and J take on values in the set of possible intensity values in the first and second images, respectively.

35. The computer readable program storage device of claim 26, wherein the method step of determining a joint correspondence from pairs of feature regions further comprises:

calculating a global image alignedness for each pair of regions from the set with a greatest likelihood of correspondence, wherein the global image alignedness of a hypothesized feature correspondence $C_{ij}$ is defined as $$L_{Global}(C_{ij}) = 2 - \frac{2H(T_{C_{ij}}(I_m), I_f)}{H(T_{C_{ij}}(I_m)) + H(I_f)},$$

wherein $I_f$ is the first image, $I_m$ is the second image, $T_{C_{ij}}(I_m)$ is the transformed image corresponding the hypothesized feature correspondence $C_{ij}$, H is is defined by $H(I) = -\int p_i(I)\log_2 p_i(I)di$, where I is an image, i takes on values in the set of possible intensity values in I, $p_i(I)$ is a probability density of the image intensities in the image I, and $H(I_1, I_2)$ for two images $I_1, I_2$ is defined as $$H(I_1, I_2) = -\int_{I_1, I_2} p(I_1, I_2)\log_2 p(I_1, I_2)di dj,$$

where the domain of the integral is over images $I_1$ and $I_2$, $p(I_1, I_2)$ is a joint probability density of the image intensities in images $I_1$ and $I_2$, and i and j take on values in the set of possible intensity values in images $I_1$ and $I_2$ respectively;

initializing the joint correspondence C to a correspondence likelihood value $C_{ij}$ from the set with a greatest likelihood of correspondence with a maximum global image alignedness;

removing the $C_{ij}$ from the set of greatest likelihood of correspondences;

calculating a current image transformation from the joint correspondence;

calculating the global image alignedness for each remaining pair of regions in the set of greatest likelihood of correspondence;

selecting a new correspondence likelihood value $C_{ij}$ with a maximum global image alignedness;

calculating the global image alignedness for a combination of the joint correspondence C and the new correspondence likelihood value $C_{ij}$, wherein if the global image alignedness is improved by the combination of the joint correspondence C and the new correspondence likelihood value $C_{ij}$, the joint correspondence is updated and the steps of removing, calculating a current image transformation, calculating a global image alignedness, selecting, and calculating the improved global image alignedness are repeated.

36. The computer readable program storage device of claim 35, the method further comprising the step of, if the global image alignedness is not improved by the combination of the joint correspondence C and the new correspondence likelihood value $C_{ij}$, outputting the current image transformation as a transformation that aligns the two images.

37. The computer readable program storage device of claim 35, the method further comprising refining region feature centers used in calculating the current image transformation to achieve sub-pixel accuracy.

38. The computer readable program storage device of claim 35, wherein the joint correspondence C is updated by $C_{ij}$ as $C \cap C_{ij}$.

* * * * *